(12) United States Patent
Matsui (10) Patent No.: US 6,215,479 B1
(45) Date of Patent: Apr. 10, 2001

(54) APPARATUS FOR DISPLAYING IMAGE WITH POINTING CHARACTER

(75) Inventor: Katsuichi Matsui, Noda (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/041,304

(22) Filed: Mar. 12, 1998

(30) Foreign Application Priority Data

Mar. 18, 1997 (JP) .................................................. 9-084456

(51) Int. Cl.[7] ...................................................... G09G 5/00
(52) U.S. Cl. ........................................... 345/173; 345/145
(58) Field of Search ................................. 345/156, 157, 345/173, 145, 326

(56) References Cited

U.S. PATENT DOCUMENTS

| | | | |
|---|---|---|---|
| 4,903,012 | * 2/1990 | Ohuchi ................................. | 340/709 |
| 5,319,384 | 6/1994 | Isenberg et al. ...................... | 345/145 |
| 5,586,243 | * 12/1996 | Barber et al. ......................... | 345/326 |
| 5,617,117 | * 4/1997 | Kataoka et al. ...................... | 345/157 |
| 5,856,822 | * 1/1999 | Du et al. .............................. | 345/145 |
| 5,874,948 | * 2/1999 | Shieh ................................... | 345/173 |

FOREIGN PATENT DOCUMENTS

| | | |
|---|---|---|
| 0557033 | 8/1993 | (EP) . |
| 62-236280 | 10/1987 | (JP) . |
| 62-286160 | 12/1987 | (JP) . |
| 5-183830 | 7/1993 | (JP) . |
| 7-219590 | 8/1995 | (JP) . |
| 8-139674 | 5/1996 | (JP) . |

OTHER PUBLICATIONS

"Smooth Mouse Pointer on Text–base Display", IBM Technical Disclosure Bulletin, vol. 35, No. 7, Dec. 1992, pp. 122–123, XP000332970.

* cited by examiner

Primary Examiner—Xiao Wu
Assistant Examiner—Kevin M. Nguyen
(74) Attorney, Agent, or Firm—Israel Gopstein

(57) ABSTRACT

A video image is displayed on an image screen of a cathode-ray tube. The image screen is partitioned into a plurality of character areas, each character area is composed of four display blocks, and each character of the video image is displayed in one character area. Also, a plurality of pointer characters respectively arranged in a position of a font area are stored in a pointing character storing unit, positions of the pointing characters differ from each other, and the position of each pointing character corresponds to a position of one display block in one character area for each character area in cases where the font area of the pointing character corresponds to the character area. Also, a touch screen panel partitioned into a plurality of input blocks is prepared, and each input block corresponds to one display block of the image screen. When a user selects a particular input block, a particular display block of a particular character area and a particular pointing character are selected by the control circuit on condition that a position of the particular pointing character in the font area corresponds to a position of the particular display block in the particular character area, and the particular pointing character is displayed in the particular display block of the image screen. Therefore, the pointing character can be displayed in every display block of any character area.

5 Claims, 6 Drawing Sheets

FIG. 1A PRIOR ART

TOUCH SCREEN PANEL

⇩

IMAGE SCREEN

FIG. 1B PRIOR ART

TOUCH SCREEN PANEL

⇩

IMAGE SCREEN

APPARATUS FOR DISPLAYING IMAGE WITH POINTING CHARACTER

BACKGROUND OF THE INVENTION

1. Field of the Invention

The present invention relates generally to an image displaying apparatus in which a prescribed pointing character is displayed with a displayed image at a prescribed position, and more particularly to an image displaying apparatus suitable for a presentation apparatus in which a pointer marker such as an arrow is displayed as a pointing character on a displayed image.

2. Description of the Related Art

2.1. Previously Proposed Art

In cases where a presentation is performed in a meeting such as a lecture meeting, a presentation apparatus such as an overhead projector or a video projector is used to display an image on an image screen. In this case, to point out a prescribed position on the displayed image, a pointing stick or a laser pointer is used as one of pointing methods. Also, as another pointing method, a pointing signal indicating a pointer marker is superimposed on a picture signal, and the pointer marker is directly displayed with an image on the image screen.

To directly display a pointer marker on an image screen, there is an idea that an image displaying apparatus useful only for a presentation apparatus is used. However, it is expensive to use an image displaying apparatus applied for only for a presentation apparatus because it takes development costs for the image displaying apparatus. Therefore, in cases where an on-screen displaying circuit generally used for a television unit or a monitor unit is used to directly display a pointer marker on an image screen, a pointer marker can be displayed on an image screen at a low cost.

2.2. Problems to be Solved by the Invention

However, in cases where the on-screen displaying circuit is used, a display performance for displaying a pointer marker (or a pointing character) indicating a prescribed position on a displayed image depends on a display performance of the on-screen displaying circuit. For example, in cases where an on-screen displaying circuit, in which 22 characters can be displayed in the lateral direction and 18 characters can be displayed in the longitudinal direction, is used, a display performance for the pointer marker becomes 22 characters in the lateral direction and 18 characters in the longitudinal direction. In other words, a display position of the pointer marker is limited to one of positions of 22 characters in the lateral direction and is limited to one of positions of 18 characters in the longitudinal direction. Therefore, there is a drawback that the display performance for the pointer marker is not sufficient.

This drawback is described in detail with reference to FIG. 1. FIGS. 1A and 1B respectively show a position input by a user to a touch screen panel and a position pointed on an image screen by a pointer marker which is displayed according to a pointing signal obtained by processing the input position in the on-screen displaying circuit. Here, the touch screen panel is used as a coordinate input unit, and the pointer marker is indicated by an arrow. Also, lateral positions of the touch screen panel are indicated by lateral coordinates X1, X2, X3,--, longitudinal positions of the touch screen panel are indicated by longitudinal coordinates Y1, Y2, Y3,--, lateral positions of the image screen are indicated by the lateral coordinates X1, X2, X3,--, and longitudinal positions of the image screen are indicated by the longitudinal coordinates Y1, Y2, Y3,--. Therefore, each of partitioned input blocks of the touch screen panel is indicated by coordinates (Xi,Yi), and each of partitioned display blocks of the image screen is indicated by coordinates (Xi,Yi).

Figure 1A:
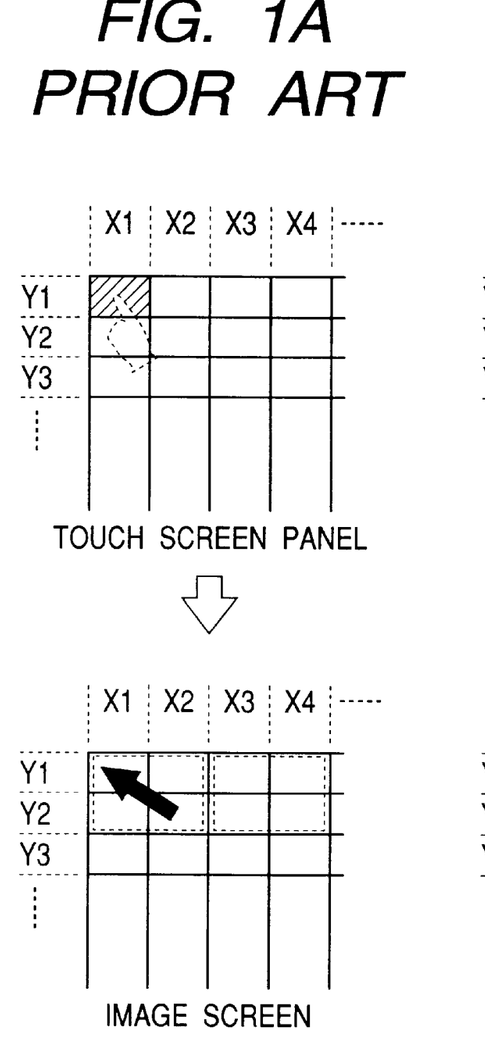
FIGS. 1A and 1B respectively show a position input by a user to a touch screen panel and a position pointed on an image screen by a pointer marker which is displayed according to a pointing signal obtained by processing the input position in the on-screen displaying circuit.
Figure 1B:
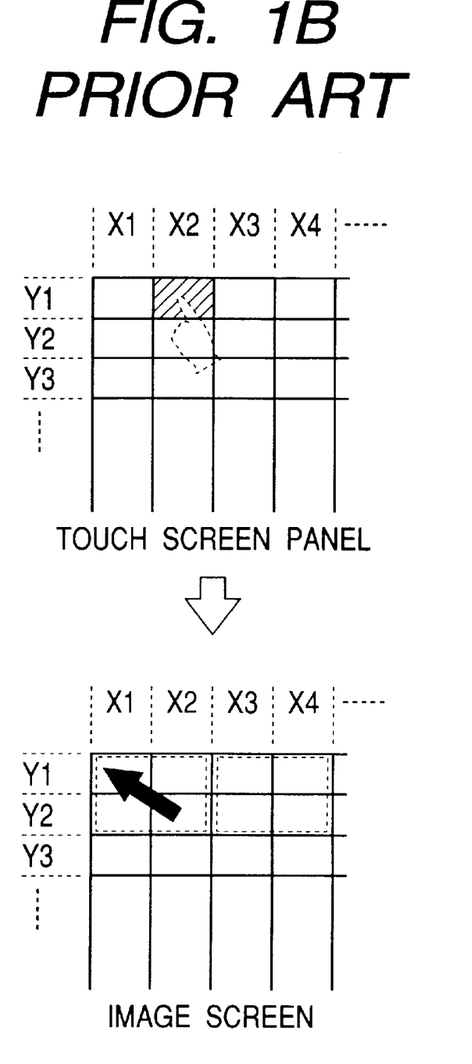

A character area in which one character is displayed is composed of four partitioned display blocks adjacent to each other in the image screen, and each character area is indicated by a closed dotted line in FIGS. 1A and 1B. Therefore, a display performance of the on-screen displaying circuit corresponds to one character area. That is, an image indicated by a picture signal transmitting through the on-screen displaying circuit can be displayed on every character area. In contrast, because a user can input a position to a touch screen panel for each partitioned input block, a position receiving performance of the touch screen panel corresponds to one partitioned input block indicated by coordinate (X,Y).

Therefore, as shown in FIG. 1A, in cases where the partitioned input block (X1,Y1) of the touch screen panel is input by the user, the partitioned display block (X1,Y1) of the image screen is pointed out by a pointer marker because the partitioned display block (X1,Y1) represents one character area corresponding to the partitioned input block (X1,Y1). Also, in cases where a block input by the user is changed to the partitioned input block (X2,Y1), it is desired that a block pointed out by the pointer marker is changed to the partitioned display block (X2,Y1) of the image screen corresponding to the partitioned input block (X2,Y1). However, as shown in FIG. 1B, because the partitioned display block (X1,Y1) represents the character area corresponding to the partitioned input block (X1,Y1), a block pointed out by the pointer marker is undesirably maintained to the partitioned display block (X1,Y1). In other words, because a display performance of the pointer marker depends on that of the on-screen displaying circuit, the partitioned display block (X2,Y1) of the image screen cannot be pointed out by the pointer marker.

Also, in cases where the user moves his finger while keeping the contact of the finger with the touch screen panel, even though a position input by the user to the touch screen panel is continuously changed, the pointer marker displayed on the image screen is discontinuously moved every two partitioned display blocks (or every character area), the pointer marker cannot be smoothly moved. For example, when the position input by the user to the touch screen panel is changed from the partitioned input block (X1,Y1) to the partitioned input block (X3,Y1) through the partitioned input block (X2,Y1), the pointer marker is directly moved from the partitioned display block (X1,Y1) to the partitioned display block (X3,Y1). Therefore, the user receives an uncomfortable feeling.

To avoid the discontinuous moving of the pointer marker, there is an idea that a display performance of the on-screen display circuit is improved. For example, the on-screen display circuit is improved to display the pointer marker for each partitioned display block or to halve the moving interval of the pointer marker. However, the improvement of the on-screen display circuit requires a high cost, and the purpose of displaying a pointer marker on an image screen at a low cost by using an on-screen displaying circuit generally used for a television receiver or a monitoring unit comes to nothing.

SUMMARY OF THE INVENTION

An object of the present invention is to provide, with due consideration to the drawbacks of such a conventional image displaying apparatus, an image displaying apparatus, in which a display performance for a pointer marker is improved at a low cost to smoothly display the pointer marker on an image screen without giving an uncomfortable feeling to the user.

The object is achieved by the provision of an image displaying apparatus for displaying a pointing character with a particular image on an image screen, comprising:

position information receiving means for receiving position information indicating a particular display block of a particular character area on the image screen, the image screen being partitioned into a plurality of character areas, each character area being partitioned into a plurality of display blocks, and each character of the particular image being displayed in one character area of the image screen;

pointing character storing means for storing a plurality of pointing characters corresponding to the plurality of display blocks of each character area of the image screen, the display block corresponding to one pointing character being different from that corresponding to another pointing character;

an on-screen displaying circuit for displaying one of the pointing characters stored in the pointing character storing means on the image screen; and control means for selecting a particular pointing character corresponding to the particular display block from the pointing characters stored in the pointing character storing means according to the position information received by the position information receiving means, and controlling the on-screen displaying circuit to display the particular pointing character in the particular display block of the particular character area of the image screen according to the position information.

In the above configuration, a particular image is displayed on an image screen. The image screen is partitioned into a plurality of character areas, each character area is partitioned into a plurality of display blocks, and each character of the particular image is displayed in one character area. Also, a plurality of pointing characters corresponding to the plurality of display blocks of each character area of the image screen are stored in the pointing character storing means.

When position information indicating a particular display block of a particular character area is received by the position information receiving means, a particular pointing character corresponding to the particular display block is selected by the control means from the pointing characters stored in the pointing character storing means, and the on-screen displaying circuit is controlled by the control means to display the particular pointing character in the particular display block of the particular character area of the image screen.

Therefore, one pointing character can be displayed in a desired position of the image screen with the particular image.

Accordingly, even though each character of the particular image is not displayed in one display block but is displayed in one character area of the image screen in the image displaying apparatus, a display performance for the pointing character can be improved because one pointing character can be displayed on any display block of the image screen.

Also, because a television set or a monitoring set generally used is used as the on-screen displaying circuit, the image displaying apparatus can be manufactured at a low cost.

It is preferred that the position information receiving means be a touch screen panel partitioned into a plurality of input blocks, each input block of the touch screen panel be arranged in a position corresponding to a position of one display block in the image screen, a particular input block corresponding to the particular display block of the particular character area be selected as the position information, each of the pointing characters stored in the pointing character storing means be indicated by a piece of font data to be arranged in a position of a font area, one position of one pointing character in one font area indicated by one piece of font data differs from that indicated by another piece of font data, the position of the pointing character indicated by each piece of font data correspond to a position of one display block in one character area for each character area in cases where the font area of the pointing character corresponds to the character area, the particular display block of the particular character area corresponding to the particular input block be specified by the control means to select a piece of particular font data indicating the particular pointing character from the pieces of font data stored in the pointing character storing means, and an on-screen signal indicating the particular pointing character arranged in a particular position of the font area be produced by the on-screen displaying circuit according to the piece of particular font data selected by the control means, the image displaying apparatus, further comprising:

displaying means for displaying the particular image on the image screen; and signal processing means for adding the on-screen signal produced by the on-screen displaying circuit to a picture signal indicating the particular image displayed by the displaying means to display the particular pointing character in the particular display block of the particular character area specified by the control means with the particular image on the displaying screen.

In the above configuration, a plurality of input blocks respectively corresponding to one of the display blocks of the image screen are prepared by the touch panel screen.

Also, pieces of font data respectively indicating one pointing character arranged in a font area are stored in the pointing character storing means. A position of the pointing character in the font area indicated by one piece of font data differs from that indicated by another piece of font data, each position of the pointing character corresponds to a position of one display block in one character area for each character area in cases where the font area corresponds to the character area.

When a particular input block is selected from among a plurality of input blocks to input the particular input block to the touch panel screen, a particular display block of a particular character area corresponding to the particular input block is specified by the control means, and a piece of particular font data indicating the particular pointing character arranged in a particular position, which corresponds to a position of the particular display block in the particular character area, is selected from the pieces of font data.

Thereafter, an on-screen signal indicating the particular pointing character arranged in the particular position of the font area is produced according to the piece of particular font data in the on-screen displaying circuit, the on-screen signal is added to a picture signal indicating the particular image by the signal processing means to display the particular pointing character in the particular display block of the particular character area, so that the particular image with the particular pointing character is displayed on the displaying screen by the displaying means.

Accordingly, even though one character area, in which one character of the particular image is displayed, is composed of a plurality of display blocks and one pointing character is displayed in one display block, because pieces of font data indicating a plurality of pointing characters corresponding to the display blocks of each character area are stored, one pointing character corresponding to each display block can be necessarily selected and be drawn in the particular image.

Also, when the user moves his finger while keeping the contact of the finger with the touch screen panel having the plurality of input blocks, because the user feels as if the pointing character displayed on the image screen is smoothly moved every display block with the movement of the finger, a viewer does not receive an uncomfortable feeling from the movement of the pointing character.

Also, because pieces of font data can be easily stored, a general television receiver or a general monitoring unit can be used as the on-screen displaying circuit, so that the image displaying apparatus can be manufactured at a low cost.

The object is also achieved by the provision of an image displaying apparatus for displaying a pointing character with a particular image on an image screen, comprising:

position information receiving means for receiving position information indicating a particular display block of a particular character area on the image screen, the image screen being partitioned into a plurality of character areas, each character area being partitioned into a plurality of display blocks, and each character of the particular image being displayed in one character area of the image screen;

pointing character storing means for storing a plurality of pointing characters and a plurality of pointing character portions respectively indicating a partial figure of one pointing character, each pointing character corresponding to one display block of each character area of the image screen, each group of pointing character portions indicating the whole figure of one pointing character and corresponding to one display block of each character area of the image screen, the display block corresponding to one pointing character or one group of pointing character portions being different from that corresponding to another pointing character or another group of pointing character portions;

an on-screen displaying circuit for displaying the whole figure of one pointing character stored in the pointing character storing means on the image screen; and control means for selecting a particular pointing character or a particular group of pointing character portions corresponding to the particular display block from the pointing characters and the pointing character portions stored in the pointing character storing means according to the position information received by the position information receiving means, and controlling the on-screen displaying circuit to display the particular pointing character in the particular display block of the particular character area of the image screen or to display the particular group of pointing character portions in the particular display block of the particular character area and one or more neighboring display blocks adjacent to the particular display block of the image screen according to the position information.

In the above configuration, a plurality of pointing character portions respectively indicating a partial figure of one pointing character are stored in the pointing character storing means in addition to a plurality of pointing characters. Each group of pointing character portions indicates the whole figure of one pointing character and corresponds to one display block of each character area of the image screen, and the display block corresponding to one group of pointing character portions differs from that corresponding to one pointing character or another group of pointing character portions.

When position information indicating a particular display block of a particular character area is received by the position information receiving means, a particular pointing character or a particular group of pointing character portions corresponding to the particular display block is selected by the control means from the pointing characters and the pointing character portions stored in the pointing character storing means, and the on-screen displaying circuit is controlled by the control means to display the particular pointing character in the particular display block of the particular character area of the image screen or to display the whole figure of the particular group of pointing character portions in the particular display block of the particular character area and one or more neighboring display blocks adjacent to the particular display block of the image screen.

Therefore, the whole figure of one pointing character can be displayed in a desired position of the image screen with the particular image even though the whole figure of one pointing character is indicated by a group of pointing character portions.

Accordingly, even though each character of the particular image is not displayed in one display block but is displayed in one character area of the image screen in the image displaying apparatus, a display performance for the pointing character can be improved because the whole figure of one pointing character can be displayed on any display block and neighboring display blocks in the image screen.

Also, even though the whole figure of one pointing character is indicated by a group of pointing character portions, because a television set or a monitoring set generally used is used as the on-screen displaying circuit, the image displaying apparatus can be manufactured at a low cost.

It is preferred that the position information receiving means be a touch screen panel partitioned into a plurality of input blocks, each input block of the touch screen panel be arranged in a position corresponding to a position of one display block in the image screen, a particular input block corresponding to the particular display block of the particular character area be selected as the position information, each of the pointing characters stored in the pointing character storing means be indicated by a piece of font data to be arranged in a font area of a font, each group of pointing character portions stored in the pointing character storing means be indicated by a piece of font data to be arranged in a plurality of font areas of a plurality of fonts, a pivotal pointing character portion exist in each group of pointing character portions, a position of a pivotal portion of one pointing character in one font area or a position of one pivotal pointing character portion in one font area indicated by one piece of font data differ from that indicated by another piece of font data, the position of one pivotal portion of one pointing character in one font area or the position of one pivotal pointing character portion in one font area indicated by each piece of font data correspond to a position of one display block in one character area for each character area in cases where the font area of the pointing character or the font area of the pivotal pointing character portion corresponds to the character area, the particular display block of the particular character area corresponding to the particular input block be specified by the control means to select a piece of particular font data, which indicates the particular pointing character having a particular pivotal portion corresponding to the particular display block or the particular group of pointing character portions including a particular pivotal pointing character portion corresponding to the particular display block, from the pieces of font data stored in the pointing character storing means, and an on-screen signal indicating the particular pointing character or the particular group of pointing character portions be produced by the on-screen displaying circuit according to the piece of particular font data selected by the control means, the image displaying apparatus, further comprising:

displaying means for displaying the particular image on the image screen; and signal processing means for adding the on-screen signal produced by the on-screen displaying circuit to a picture signal indicating the particular image displayed by the displaying means to display the particular pivotal portion of the particular pointing character in the particular display block of the particular character area specified by the control means with the particular image on the displaying screen or to display the particular group of pointing character portions in the particular display block and the neighboring display blocks with the particular image on the displaying screen.

In the above configuration, the pointing character indicated by each piece of font data stored in the pointing character storing means extends over a plurality of display blocks when the pointing character is superimposed on the particular image. Therefore, in cases where a pivot portion of the pointing character is placed at a corner portion of the font area, the pointing character displayed on the image screen extends over a plurality of character areas.

In the present invention, a piece of particular font data indicating a particular pointing character or a particular group of pointing character portions having a particular pivotal pointing character portion is selected by the control means to arrange the pivotal portion of the particular pointing character in the particular display block of the particular character area or to arrange the particular pivotal pointing character portion in the particular display block of the particular character area. Therefore, the particular pointing character designating a particular display block can be displayed on the image screen when a user selects a particular input block corresponding to the particular display block.

BRIEF DESCRIPTION OF THE DRAWINGS

The objects, features and advantages of the present invention will be apparent from the following description taken in conjunction with the accompanying drawings, in which.

DETAILED DESCRIPTION OF THE EMBODIMENTS

Preferred embodiments of an image displaying apparatus according to the present invention are described with reference to the drawings.

Figure 2:
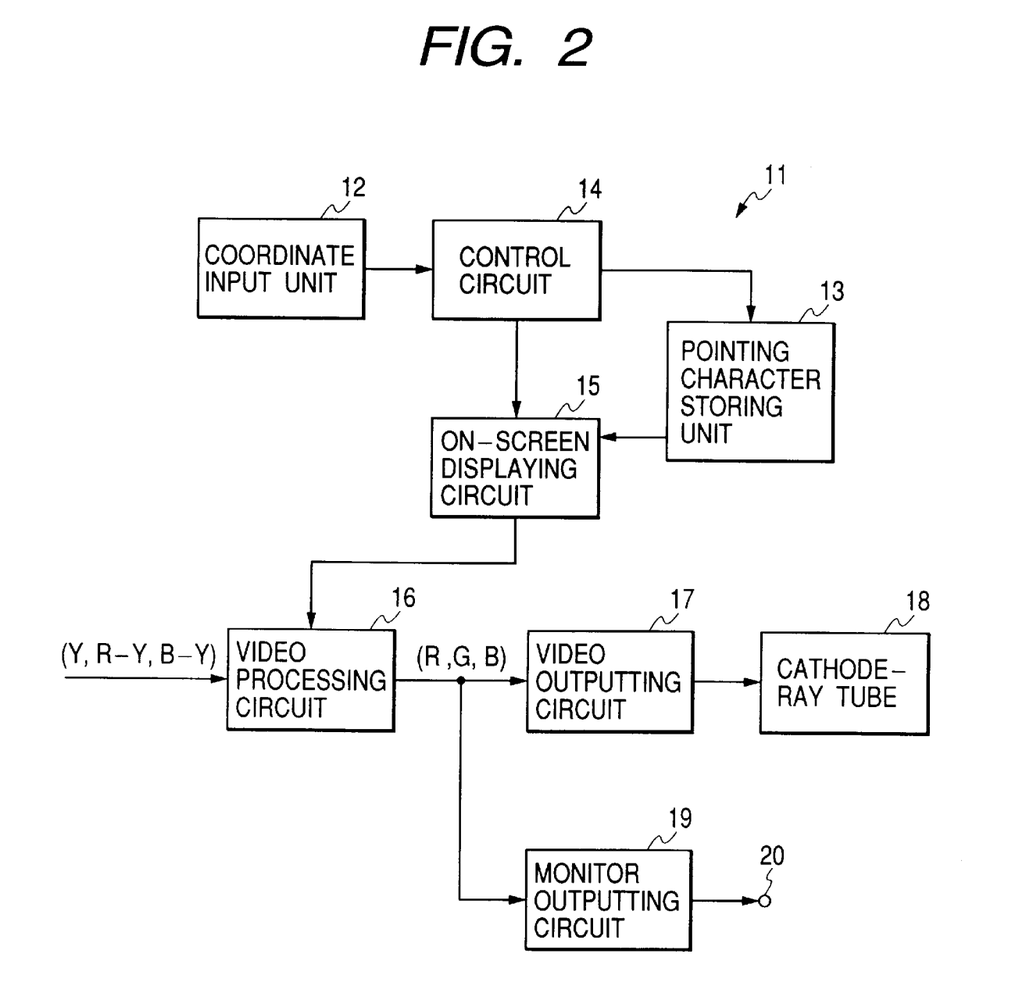
FIG. 2 is a block diagram of an image displaying apparatus according to a first embodiment of the present invention.

FIG. 2 is a block diagram of an image displaying apparatus according to a first embodiment of the present invention.

As shown in FIG. 2, an image displaying apparatus 11 for displaying a video image on an image screen which is partitioned into a plurality of character areas respectively composed of four partitioned display blocks, comprises:

a coordinate input unit 12, made of a touch screen panel partitioned into a plurality of partitioned input blocks, for inputting a particular position (X,Y) input by a user as position information by touching a user's finger to a particular partitioned input block, a position of each partitioned input block being indicated by coordinates (X,Y), each partitioned input block corresponding to one of the partitioned display blocks of the image screen, and each partitioned input block corresponding to one character area in which one partitioned display block corresponding to the partitioned input block is arranged;

a pointing character storing unit 13, made of a read only memory (ROM), for storing first font data indicating a first type font F1, second font data indicating a second type font F2, third font data indicating a third type font F3 and fourth font data indicating a fourth type font F4, a pointing character (or a pointer marker having a shape of an arrow) being arranged in each type font, an arranging position of the pointing character in one type font differing from that in another type font, the figure of the pointing character in one font being the same as that in another font, and a position of the pointing character in a font area of each type font corresponding to one partitioned display block of one character area for each character area in cases where the font area corresponds to the character area;

a control circuit 14, made of a microcomputer, for specifying a particular character area of the image screen corresponding to the particular partitioned input block according to the position information input to the coordinate input unit 12, specifying a position of a particular partitioned display block in the particular character area according to the position information, and selecting one piece of particular font data indicating a particular type font from the pieces of font data stored in the pointing character storing unit 13 according to the position of the particular partitioned display block in the particular character area;

an on-screen displaying circuit 15, made of a general television receiver or a general monitoring unit, for producing an on-screen signal indicating a particular pointing character arranged in the particular type font selected by the control circuit 14 and producing a blanking signal indicating the blanking of a pointing character region in which the particular pointing character of the particular type font is arranged in cases where the particular type font is arranged to overlap with the particular character area specified by the control circuit 14;

a video processing circuit 16 for receiving a picture signal composed of a luminance signal Y and color difference signals R−Y and B−Y, processing the picture signal to correct a color and tint of a video image indicated by the picture signal, blanking a partial video image placed in a region overlapping with the pointing character region, in cases where the particular type font is arranged to overlap with the particular character area, according to the blanking signal received from the on-screen displaying circuit 15, adding the on-screen signal received from the on-screen displaying circuit 15 to the picture signal to superimpose the particular pointing character of the particular type font on the video image, and outputting three primary color signals R, G and B indicating a processed video image in which the particular pointing character of the particular type font is superimposed on the video image to designate the particular partitioned display block of the particular character area;

a video outputting circuit 17 for controlling the output of the primary color signals R, G and B indicating the processed video image;

a cathode-ray tube 18 having the image screen for displaying on the image screen the processed video image indicated by the color signals R, G and B transmitted from the video processing circuit 16 through the video outputting circuit 17; and a monitor outputting circuit 19 for outputting the color signals R, G and B transmitted from the video processing circuit 16 to a monitor output terminal 20 to display the processed video image on a large image screen through a video projector.

The touch screen panel of the coordinate input unit 12 is partitioned to a plurality of partitioned input blocks in the same manner as that shown in FIGS. 1A and 1B. Therefore, each of the partitioned input blocks of the touch screen panel is indicated by coordinates (X,Y). Also, an image screen of the cathode-ray tube 18 is partitioned to a plurality of partitioned display blocks in the same manner as that shown in FIGS. 1A and 1B. Therefore, each of the partitioned display blocks of the image screen is indicated by coordinates (X,Y).

Each character area in which one character is displayed is composed of four partitioned display blocks (Xi,Yi), (Xi+1,Yi), (Xi,Yi+1) and (Xi+1,Yi+1) adjacent to each other in the image screen or the large image screen.

Figure 3:
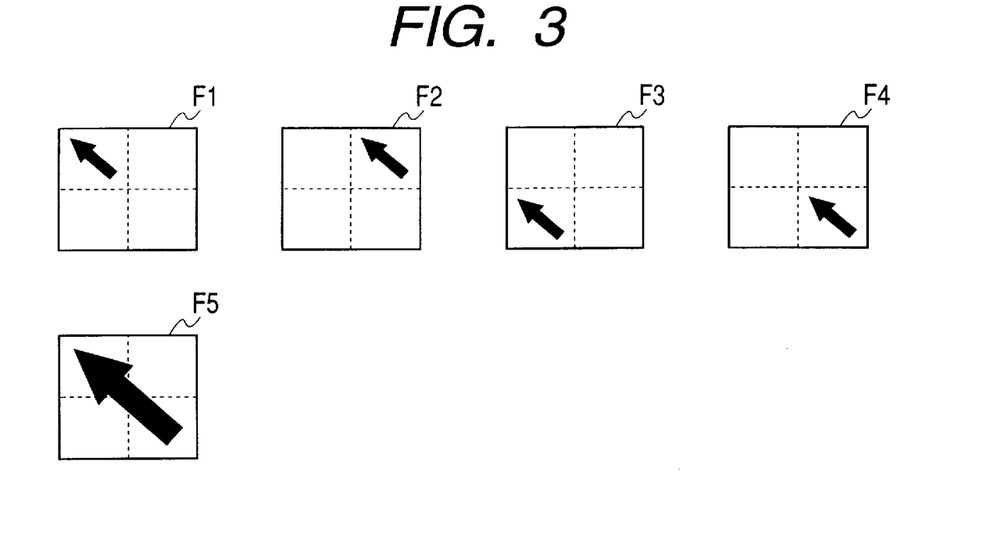
FIG. 3 shows a plurality of types of fonts stored in a character storing unit of the image displaying apparatus shown in FIG. 2.

FIG. 3 shows the plurality of types of fonts stored in the pointing character storing unit 13. As shown in FIG. 3, in the first type font F1, an arrow denoting a pointing character is arranged on the upper left side of a font area corresponding to one character area as a pointing character designating the upper left side of the font area. In the second type font F2, an arrow denoting a pointing character is arranged on the upper right side of a font area corresponding to one character area as a pointing character designating the upper right side of the font area. In the third type font F3, an arrow denoting a pointing character is arranged on the lower left side of a font area corresponding to one character area as a pointing character designating the lower left side of the font area. In the fourth type font F4, an arrow denoting a pointing character is arranged on the lower right side of a font area corresponding to one character area as a pointing character designating the lower right side of the font area. Also, In a fifth type font F5, an arrow indicating a pointing character is arranged in a whole font area corresponding to one character area. The fifth type font F5 corresponds to the pointing character shown in FIGS. 1A and 1B and is shown an a comparative example. Here, dotted lines drawn in each type font are shown for convenience.

In the above configuration of the image displaying apparatus 11, when no coordinate is input to the coordinate input unit 12 by a user, the operation in the pointing character storing unit 13 and the on-screen displaying circuit 15 is stopped under the control of the control circuit 14. Therefore, a picture signal composed of a luminance signal Y and color difference signals R−Y and B−Y is processed in the video processing circuit 16, three color signals R, G and B indicating a video image are output to the cathode-ray tube 18 through the video outputting circuit 17, and the video image is displayed.

When a user inputs a particular position (X,Y) to the coordinate input unit 12 as position information by touching the user's finger to a particular partitioned input block placed at coordinates (X,Y), a particular character area of the image screen corresponding to the particular partitioned input block and a particular partitioned display block corresponding to the particular partitioned input block are specified according to the position information by the control circuit 14. Thereafter, one piece of particular font data indicating a particular type font is read out from the pieces of font data stored in the pointing character storing unit 13 according to a position of the particular partitioned display block in the particular character area.

Thereafter, in the on-screen displaying circuit 15, an on-screen signal indicating a particular pointing character arranged in the particular type font is produced, and a blanking signal indicating the blanking of a pointing character region of the particular character area, in which the particular pointing character of the particular type font is arranged in cases where the particular type font is arranged to overlap with the particular character area, is produced.

Thereafter, in the video processing circuit 16, the picture signal is processed according to the blanking signal to blank a partial video image placed in a region overlapping with the pointing character region in cases where the particular type font is arranged to overlap with the particular character area, and the on-screen signal is added to the picture signal to superimpose the particular pointing character of the particular type font on the video image. Thereafter, a processed video image, in which the particular pointing character of the particular type font is superimposed on the video image, is displayed on the image screen of the cathode-ray tube 18. Also, in cases where the user desires to display the processed video image on a large image screen, the processed video image is output to a video projector (not shown) through the monitor output terminal 20 and is displayed on the large image screen.

Next, the display of the pointing character indicated by the particular type font is described in detail with reference to FIGS. 4A and 4B.

Figure 4A:
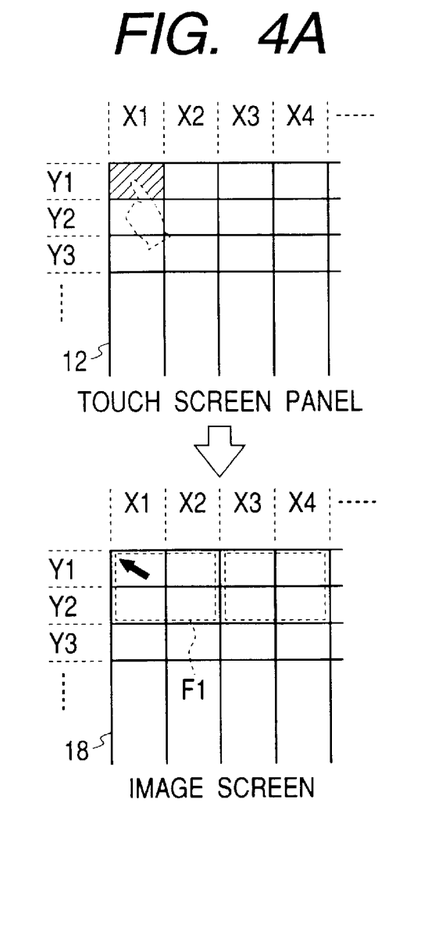
FIGS. 4A and 4B respectively show a position input by a user to a touch screen panel functioning as a coordinate input unit and a position designated on an image screen of a cathode-ray tube by a pointing character of a particular type font.
Figure 4B:
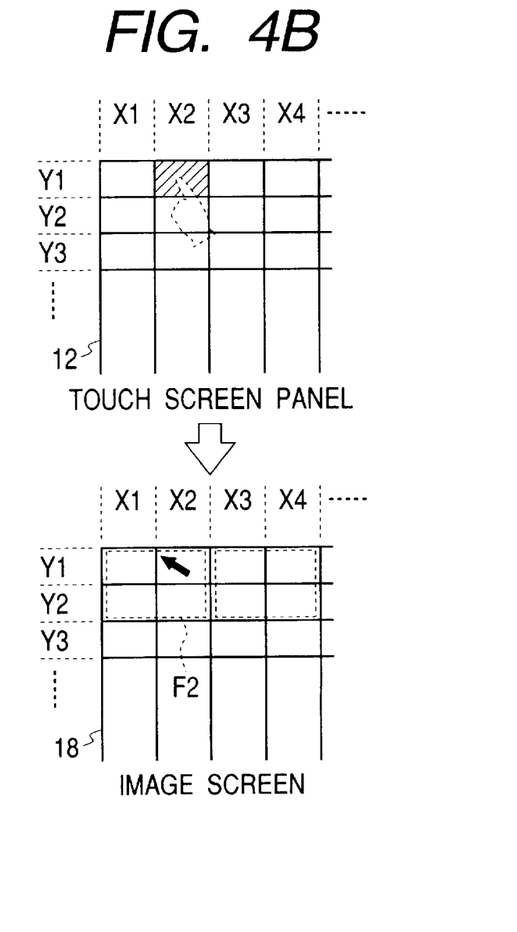

FIGS. 4A and 4B respectively show a position input by a user to the touch screen panel of the coordinate input unit 12 and a position pointed on the image screen of the cathode-ray tube 18 or on the large image screen by the pointing character of the particular type font which is displayed according to the on-screen signal. Here, each character area is indicated by a closed dotted line in FIGS. 4A and 4B.

In this case, a position receiving performance of the touch screen panel corresponds to one partitioned input block indicated by coordinates (X,Y), and a display performance of the image screen or the large image screen corresponds to one character area.

As shown in FIG. 4A, when the coordinates (X1,Y1) are input to the coordinate input unit 12 by the user as position information, because a particular character area corresponding to the coordinates (X1,Y1) ranges from X1 to X2 in the lateral direction and ranges from Y1 to Y2 in the longitudinal direction and because a particular partitioned display block corresponding to the coordinates (X1,Y1) is placed on the upper left side of the particular character area, the first type font F1, in which an arrow representing a pointing character designates the upper left side of a font area, is selected by the on-screen displaying circuit 15 under the control of the control circuit 14. Thereafter, a blanking signal indicating the blanking of a partial video image overlapping with the pointing character of the first type font F1 in a pointing character region of the particular character area is transmitted to the video processing circuit 16, an on-screen signal indicating the pointing character of the first type font F1 is transmitted to the video processing circuit 16, and a pointing character of the first type font F1 is superimposed on the video image to arrange the pointing character of the first type font F1 in the particular character area. Thereafter, the video image with the pointing character of the first type font F1 is displayed on the image screen or the large image screen. Therefore, the particular partitioned display block corresponding to the coordinates (X1,Y1) input by the user can be designated by the pointing character.

Also, as shown in FIG. 4B, when the coordinates (X2,Y1) are input to the coordinate input unit 12 by the user as position information, because a particular character area corresponding to the coordinates (X2,Y1) ranges from X1 to X2 in the lateral direction and ranges from Y1 to Y2 in the longitudinal direction and because a particular partitioned display block corresponding to the coordinates (X2,Y1) is placed on the upper right side of the particular character area, the second type font F2, in which an arrow representing a pointing character designates the upper right side of a font area, is selected by the on-screen displaying circuit 15 under the control of the control circuit 14. Thereafter, a blanking signal indicating the blanking of a partial video image overlapping with the pointing character of the second type font F2 in a pointing character region of the particular character area is transmitted to the video processing circuit 16, an on-screen signal indicating the pointing character of the second type font F2 is transmitted to the video processing circuit 16, and the pointing character of the second type font F2 is superimposed on the video image to arrange the pointing character of the second type font F2 in the particular character area. Thereafter, the video image with the pointing character of the second type font F2 is displayed on the image screen or the large image screen, so that the particular partitioned display block corresponding to the coordinates (X2,Y1) input by the user can be designated by the pointing character.

Therefore, even though a display performance of the image screen or the large image screen corresponds to one character area, a pointing character (or a pointer marker) can be displayed on every partitioned display block in the lateral direction.

In the same manner, a pointing character can be displayed on every partitioned display block in the longitudinal direction. For example, when the coordinates (X1,Y2) are input to the coordinate input unit 12 by the user, the third type font F3 is selected by the on-screen displaying circuit 15, and a pointing character of the third type font F3 is superimposed on the video image. Also, when the coordinates (X2,Y2) are input to the coordinate input unit 12 by the user, the fourth type font F4 is selected by the on-screen displaying circuit 15, and a pointing character of the fourth type font F4 is superimposed on the video image.

Accordingly, because a particular type font is selected by the on-screen displaying circuit 15 when the user inputs coordinates (X,Y) and because the pointing character of the particular type font is superimposed on the video image in the video processing circuit 16 to arrange the pointing character of the particular type font at a pointing character region of a particular character area corresponding to the coordinates (X,Y), a video image with the pointing character of the particular type font is displayed on the image screen or the large image screen, so that a particular partitioned display block corresponding to the coordinates (X,Y) can be designated by the pointing character of the particular type font.

Also, when the user moves his finger while keeping the contact of the finger with the touch screen panel, because the user feels as if the pointing character displayed on the image screen is smoothly moved every partitioned display block with the movement of the finger, a viewer does not receive an uncomfortable feeling from the movement of the pointing character.

Also, because a plurality of fonts can be easily stored in the pointing character storing unit 13, a general television receiver or a general monitoring unit can be used as the on-screen displaying circuit 15, so that the image displaying apparatus 11 can be manufactured at a low cost.

In this embodiment, each character area is composed of four partitioned display blocks. However, the present invention is not limited to the character area composed of four partitioned display blocks. That is, in cases where a type of font is prepared for each of partitioned display blocks included in one character area, the pointing character displayed on the image screen can be smoothly moved every partitioned display block.

Next, a second embodiment is described.

In the first embodiment, the pointing character having a shape of an arrow is superimposed on a video image to be arranged in one partitioned display block. Therefore, in cases where the number of partitioned display blocks in one character area is increased, a size of the pointing character is made small as compared with a size of one character displayed in the character area, so that the degree of design freedom for the shape of the pointing character is lowered and visibility of the pointing character for a viewer is lowered. To solve this drawback in the second embodiment, a size of a pointing character is enlarged to be arranged in a plurality of partitioned display blocks. In this case, because the pointing character is not arranged in a single partitioned display block, when an end region of a particular character area is designated by the pointing character, the whole figure of the pointing character cannot be arranged in the particular character area. Therefore, in the second embodiment, the pointing character is superimposed on a video image to be arranged in a plurality of character areas.

Figure 5:
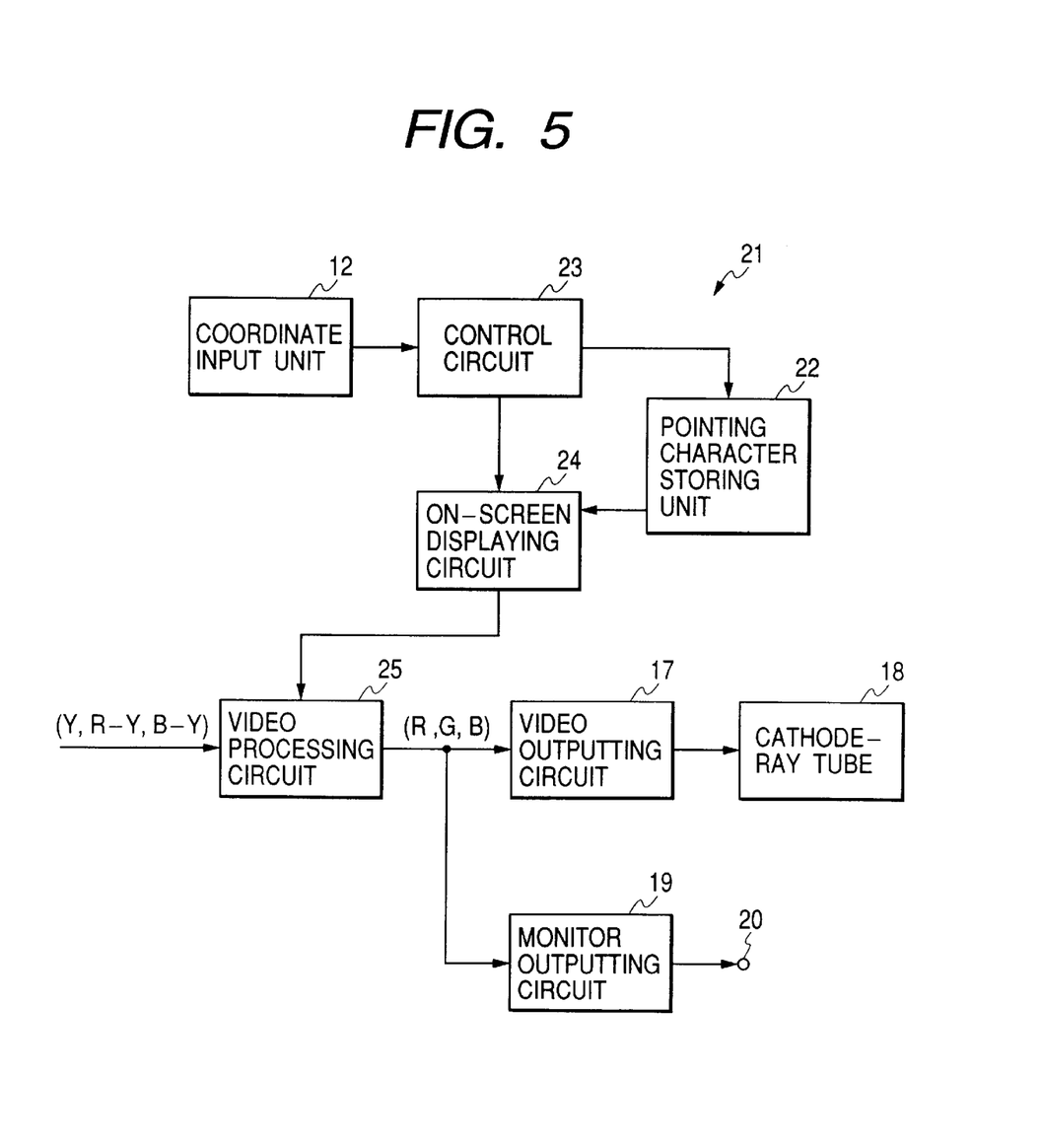
FIG. 5 is a block diagram of an image displaying apparatus according to the second embodiment of the present invention.

FIG. 5 is a block diagram of an image displaying apparatus according to the second embodiment of the present invention.

As shown in FIG. 5, an image displaying apparatus 21 for displaying a video image on an image screen which is partitioned into a plurality of character areas respectively composed of four partitioned display blocks, comprises:

the coordinate input unit 12;

a pointing character storing unit 22, made of a read only memory (ROM), for storing pieces of font data respectively indicating a pointing character (or a pointer marker having a shape of an arrow) arranged in a font or a group of fonts, a pivotal portion of each pointing character being arranged in one font, a position of the pivotal portion of the pointing character in a font area of one font differing from that in another font, the whole figure of the pointing character in one font (or in one group of fonts) being the same as that of the pointing character in another font (or in another group of fonts), and a position of the pivotal portion of the pointing character in the font area of each font corresponding to a position of one partitioned display block in one character area for each character area in cases where the font area corresponds to the character area;

a control circuit 23, made of a microcomputer, for specifying a particular character area of the image screen corresponding to the particular partitioned input block according to the position information input to the coordinate input unit 12, specifying a position of a particular partitioned display block in the particular character area according to the position information, and selecting one piece of font data indicating a particular pointing character of a particular font (or a plurality of particular fonts) from the pieces of font data stored in the pointing character storing unit 22 according to the position of the particular partitioned display block in the particular character area, a position of the pivotal portion of the particular pointing character in one font area of one particular font corresponding to a position of the particular partitioned display block in the particular character area;

an on-screen displaying circuit 24, made of a general television receiver or a general monitoring unit, for producing an on-screen signal indicating the particular pointing character arranged in the particular font or the particular fonts selected by the control circuit 23, producing a blanking signal indicating the blanking of a pointing character region in which the particular pointing character indicated by the particular font overlapping with the particular character area is arranged in cases where the selected font data indicates only the particular font, and producing a blanking signal indicating the blanking of a pointing character region in which the particular pointing character indicated by the particular fonts overlapping with the particular character area and one or more neighboring character areas adjacent to the particular character area is arranged in cases where the selected font data indicates the plurality of particular fonts;

a video processing circuit 25 for receiving a picture signal composed of a luminance signal Y and color difference signals R−Y and B−Y, processing the picture signal to correct a color and tint of a video image indicated by the picture signal, blanking a partial video image placed in a region overlapping with the pointing character region according to the blanking signal received from the on-screen displaying circuit 24 in cases where the particular font is arranged to overlap with the particular character area or the particular fonts are arranged to overlap with the particular character area and the neighboring character areas, adding the on-screen signal received from the on-screen displaying circuit 24 to the picture signal to display the particular pointing character of the particular font or the particular fonts in the pointing character region for the purpose of superimposing the particular pointing character on the video image, and outputting three primary color signals R, G and B indicating a processed video image in which the particular pointing character of the particular font or the particular fonts is superimposed on the video image to designate the particular partitioned display block of the particular character area;

the video outputting circuit 17 for controlling the output of the primary color signals R, G and B indicating the processed video image; the cathode-ray tube 18; and the monitor outputting circuit 19.

Each character area in which one character is displayed is composed of twelve partitioned display blocks (Xi,Yi), (Xi+1,Yi), (Xi+2,Yi), (Xi,Yi+1), (Xi+1,Yi+1), (Xi+2,Yi+1), (Xi,Yi+2), (Xi+1,Yi+2), (Xi+2,Yi+2), (Xi,Yi+3), (Xi+1,Yi+3) and (Xi+2,Yi+3), adjacent to each other in the image screen or the large image screen. That is, each character area extends over three partitioned display blocks in the lateral direction and extends over four partitioned display blocks in the longitudinal direction.

Figure 6:
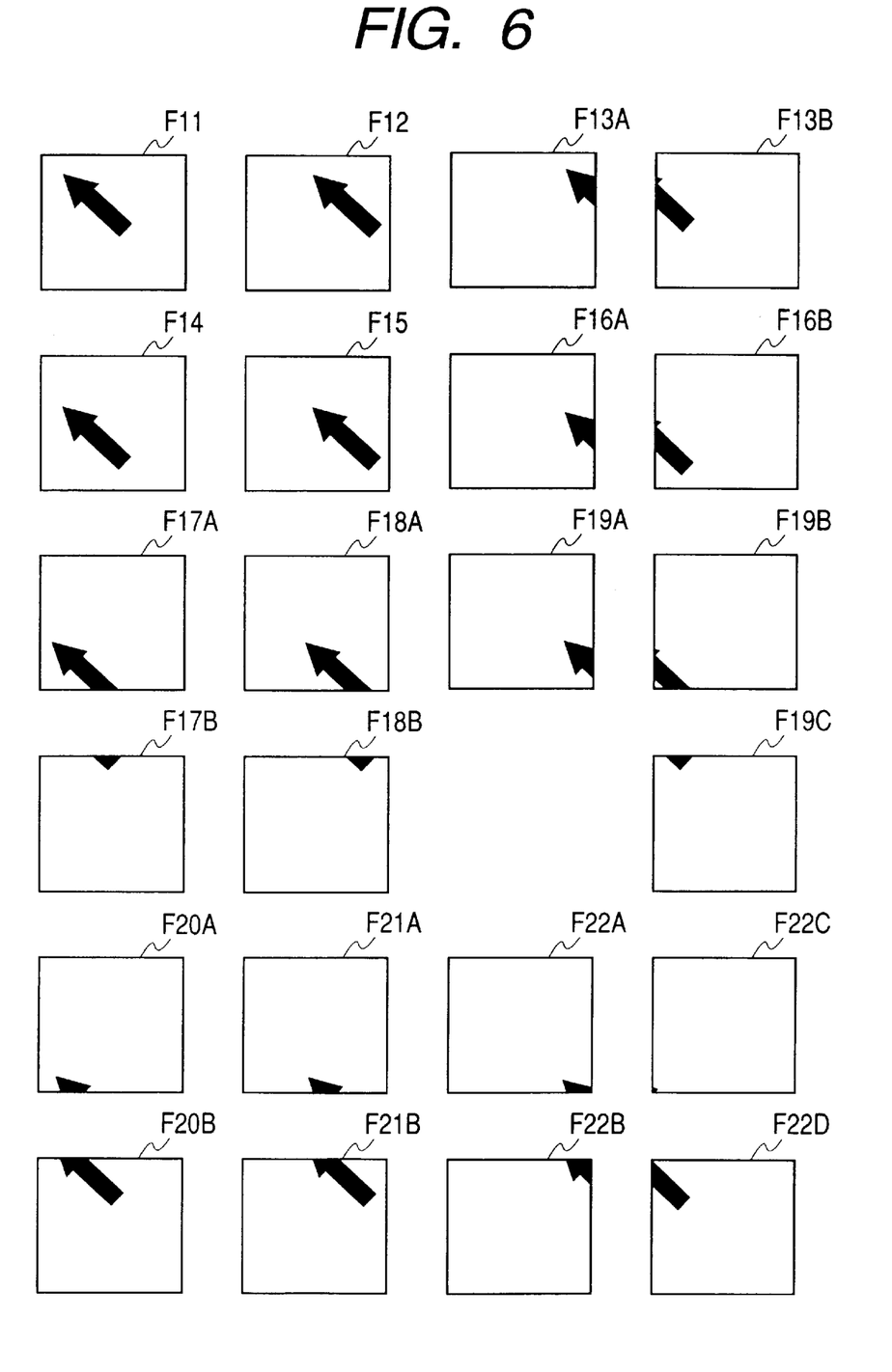
FIG. 6 shows a plurality of types of fonts stored in a character storing unit of the image displaying apparatus shown in FIG. 5.

FIG. 6 shows a plurality of fonts stored in the pointing character storing unit 22. As shown in FIG. 6, a first type font F11 indicated by first font data designates an upper left portion of a font area and corresponds to the partitioned display block (Xi,Yi) in each character area. A second type font F12 indicated by second font data designates an upper middle portion of a font area and corresponds to the partitioned display block (Xi+1,Yi) in each character area. A pair of third type font F13A and F13B indicated by third font data designates an upper right portion of a font area and corresponds to the partitioned display block (Xi+2,Yi) in each character area. A fourth type font F14 indicated by fourth font data designates a left portion placed under the upper left portion and corresponds to the partitioned display block (Xi,Yi+1) in each character area. A fifth type font F15 indicated by fifth font data designates a middle portion placed under the upper middle portion and corresponds to the partitioned display block (Xi+1,Yi+1) in each character area. A pair of sixth type font F16A and F16B indicated by sixth font data designates a right portion placed under the upper right portion and corresponds to the partitioned display block (Xi+2,Yi+1) in each character area. A pair of seventh type fonts F17A and F17B indicated by seventh font data designates a lower left portion placed under the left portion and corresponds to the partitioned display block (Xi,Yi+2) in each character area. A pair of eighth type fonts F18A and F18B indicated by eighth font data designates a lower middle portion placed under the middle portion and corresponds to the partitioned display block (Xi+1,Yi+2) in each character area. Three ninth type fonts F19A, F19B and F19C indicated by ninth font data designates a lower right portion placed under the right portion and corresponds to the partitioned display block (Xi+2,Yi+2) in each character area. A pair of tenth type fonts F20A and F20B indicated by tenth font data designates a lowest left portion placed under the lower left portion and corresponds to the partitioned display block (Xi,Yi+3) in each character area. A pair of eleventh type fonts F21A and F21B indicated by eleventh font data designates a lowest middle portion placed under the lower middle portion and corresponds to the partitioned display block (Xi+1,Yi+3) in each character area. Four twelfth type fonts F21A, F21B, F21C and F21D indicated by twelfth font data designates a lowest right portion placed under the lower right portion and corresponds to the partitioned display block (Xi+2,Yi+3) in each character area.

The pair of third type font F13A and F13B, the pair of sixth type font F16A and F16B, the pair of seventh type fonts F17A and F17B, the pair of eighth type fonts F18A and F18B, the group of three ninth type fonts F19A, F19B and F19C, the pair of tenth type fonts F20A and F20B, the pair of eleventh type fonts F21A and F21B and the group of four twelfth type fonts F21A, F21B, F21C and F21D respectively make the same arrow as that respectively made by the first type font F11, the second type font F12, the fourth type font F14 and the fifth type font F15. An upper left portion of each pointing character having a shape of an arrow is called a pivotal portion.

In the above configuration of the image displaying apparatus 21, when a user inputs a particular position (X,Y) to the coordinate input unit 12 as position information by touching the user's finger to a particular partitioned input block placed at coordinates (X,Y), a particular character area of the image screen corresponding to the particular partitioned input block and a particular partitioned display block corresponding to the particular partitioned input block are specified according to the position information by the control circuit 23. Thereafter, one piece of particular font data indicating a particular font, in which the whole figure of a particular pointing character is drawn, or one piece of particular font data indicating a group of particular fonts, in which the whole figure of a particular pointing character is drawn, is read out from the pieces of font data stored in the pointing character storing unit 22 according to a position of the particular partitioned display block in the particular character area on condition that a position of the pivotal portion of the particular pointing character in one font area of one particular font corresponds to a position of the particular partitioned display block in the particular character area.

Thereafter, in the on-screen displaying circuit 24, an on-screen signal indicating the particular pointing character arranged in the particular type font or the particular type fonts is produced. Also, in cases where the selected font data indicates only the particular type font, a blanking signal indicating the blanking of a pointing character region, in which the particular pointing character indicated by the particular type font is arranged when the particular type font is placed to overlap with the particular character area, is produced. Also, in cases where the selected font data indicates the plurality of particular type font, a blanking signal indicating the blanking of a pointing character region in which the particular pointing character indicated by the particular type fonts is arranged when the particular type fonts are placed to overlap with the particular character area and one or more neighboring character areas adjacent to the particular character area.

Thereafter, in the video processing circuit 25, a partial video image placed in a region overlapping with the pointing character region is blanked according to the blanking signal in cases where the particular type font is arranged to overlap with the particular character area or the particular type fonts are arranged to overlap with the particular character area and the neighboring character areas, the on-screen signal received from the on-screen displaying circuit 24 is added to the picture signal to superimpose the particular pointing character of the particular type font or the particular type fonts on the video image, and three primary color signals R, G and B indicating a processed video image are produced. In the processed video image, the particular pointing character of the particular type font or the particular type fonts is superimposed on the video image to designate the particular partitioned display block of the particular character area.

Thereafter, the processed video image is displayed on the image screen of the cathode-ray tube 18. Also, in cases where the user desires to display the processed video image on a large image screen, the processed video image is output to a video projector (not shown) through the monitor output terminal 20 and is displayed on the large image screen.

Next, the display of the pointing character indicated by the particular type font is described in detail with reference to FIGS. 7A, 7B and 7C.

Figure 7A:
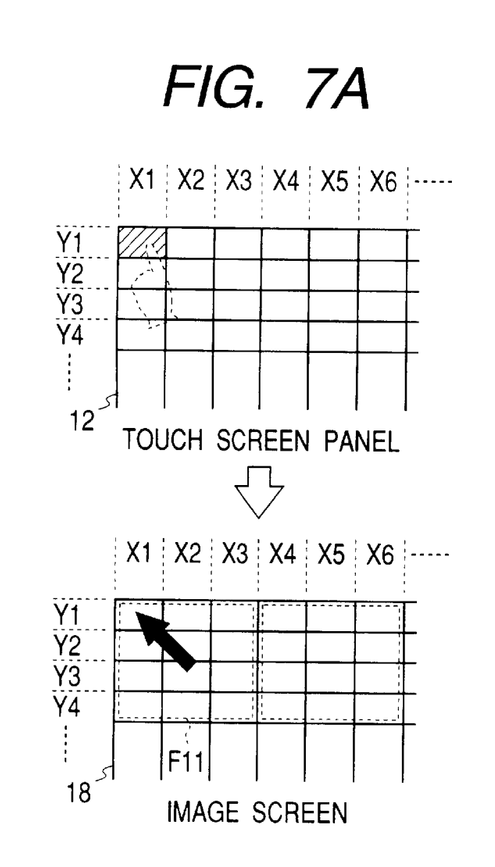
FIGS. 7A, 7B and 7C respectively show a position input by a user to a touch screen panel functioning as a coordinate input unit and a position designated on an image screen of a cathode-ray tube by a pointing character of a particular type font (or fonts).
Figure 7B:
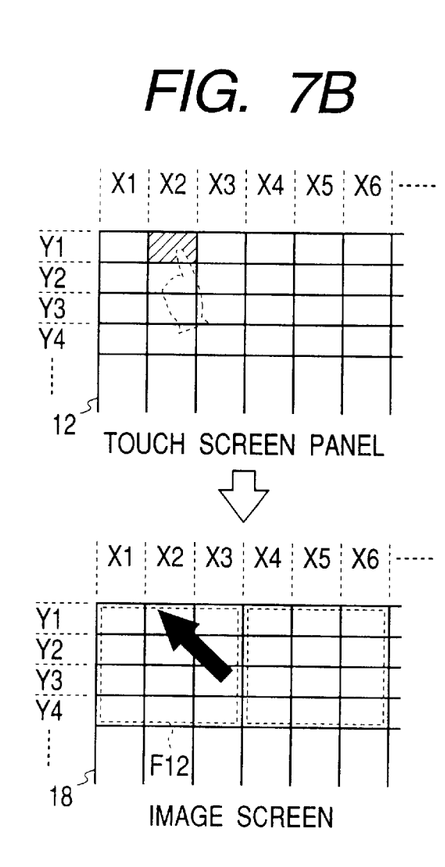
Figure 7C:
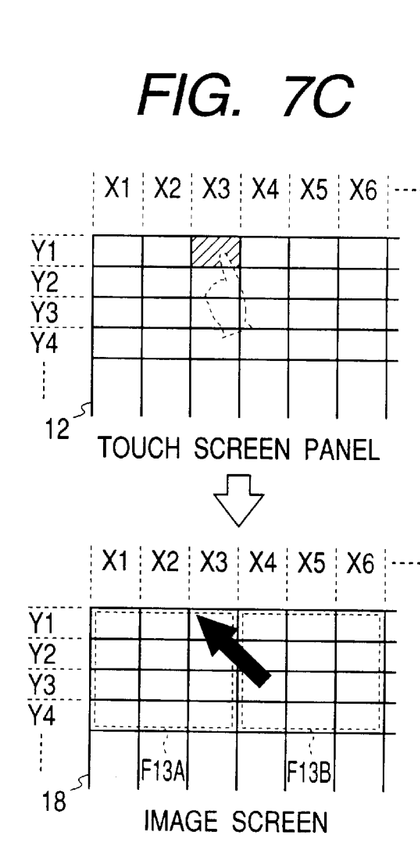

FIGS. 7A, 7B and 7C respectively show a position input by a user to the touch screen panel of the coordinate input unit 12 and a position pointed on the image screen of the cathode-ray tube 18 or on the large image screen by the pointing character of the particular type font (or fonts) which is displayed according to the on-screen signal. Here, each character area is indicated by a closed dotted line in FIGS. 7A, 7B and 7C.

As shown in FIG. 7A, when a particular position (X1,Y1) representing the coordinates (Xi,Yi) is input to the coordinate input unit 12 by the user as position information, because a particular character area corresponding to the coordinates (X1,Y1) ranges from X1 to X3 in the lateral direction and ranges from Y1 to Y4 in the longitudinal direction and because a particular partitioned display block corresponding to the particular position (X1,Y1) is placed on the upper left portion of the particular character area, the first type font F11, in which a pivotal portion of a pointing character is placed in the upper left portion of a font area, is selected by the on-screen displaying circuit 24 under the control of the control circuit 23. Thereafter, a blanking signal indicating the blanking of a partial video image overlapping with the pointing character of the first type font F11 in a pointing character region of the particular character area is transmitted to the video processing circuit 25, an on-screen signal indicating the pointing character of the first type font F11 is transmitted to the video processing circuit 25, and the pointing character of the first type font F11 is superimposed on the video image to arrange the pointing character of the first type font F11 in the pointing character region of the particular character area. Thereafter, the video image with the pointing character of the first type font F11 is displayed on the image screen or the large image screen. Therefore, the particular partitioned display block corresponding to the coordinates (X1,Y1) input by the user can be designated by the pointing character.

Also, as shown in FIG. 7B, when a particular position (X2,Y1) representing the coordinates (Xi+1,Yi) is input to the coordinate input unit 12 by the user, the second type font F12 is selected by the on-screen displaying circuit 24, and a pointing character indicated by the second type font F12 is superimposed on the video image.

Also, when the particular position (X1,Y2) representing the coordinates (Xi,Yi+1) (o r the particular position (X2, Y2) representing the coordinates (Xi+1,Yi+1)) are input to the coordinate input unit 12 by the user, the fourth type font F14 (or the fifth type font F15) is selected by the on-screen displaying circuit 24, and a pointing character indicated by the fourth type font F14 (or the fifth type font F15) is superimposed on the video image.

In contrast, as shown in FIG. 7C, when a particular position (X3,Y1 ) representing the coordinates (Xi+2,Yi) is input to the coordinate input unit 12 by the user as position information, because a particular character area corresponding to the particular position (X3,Y1) ranges from X1 to X3 in the lateral direction and ranges from Y1 to Y4 in the longitudinal direction and because a particular partitioned display block corresponding to the particular position (X3, Y1) is placed on the upper right portion of the particular character area, the pair of third type fonts F13A an d F13B, in which a pivotal portion of a pointing character is placed in the upper right portion of a font area of the third type font F13A, is selected by the on-screen displaying circuit 24 under the control of the control circuit 23. Thereafter, a blanking signal indicating the blanking of a partial video image overlapping with the pointing character of the pair of third type fonts F13A and F13B in a pointing character region of the particular character area and a neighboring character area adjacent to the particular character area in the right direction is transmitted to the video processing circuit 25, an on-screen signal indicating the pointing character of the pair of third type fonts F13A and F13B is transmitted to the video processing circuit 25, and the pointing character of the pair of third type fonts F13A and F13B is superimposed on the video image to arrange a portion of the pointing character indicated by the third type font F13A in the particular character area and to arrange the remaining portion of the pointing character indicated by the third type font F13B in the neighboring character area. Thereafter, the video image with the pointing character of the pair of third type fonts F13A and F13B is displayed on the image screen or the large image screen. Therefore, the particular partitioned display block corresponding to the coordinates (X3, Y1) input by the user can be designated by the pointing character indicated by the pair of third type fonts F13A and F13B.

Also, when a particular position (X3,Y2) representing the coordinates (Xi+2,Yi+1) are input to the coordinate input unit 12 by the user, the pair of sixth type fonts F16A and F16B is selected by the on-screen displaying circuit 24, and a pointing character indicated by the pair of sixth type fonts F16A and F16B is superimposed on the video image to arrange a portion of the pointing character indicated by the sixth type font F16A in a particular character area corresponding to the particular position (X3,Y2) and to arrange the remaining portion of the pointing character indicated by the sixth type font F16B in a neighboring character area adjacent to the particular character area in the right direction.

Also, when a particular position (X1,Y3) representing the coordinates (Xi,Yi+2), a particular position (X2,Y3) representing the coordinates (Xi+1,Yi+2), a particular position (X1,Y4) representing the coordinates (Xi,Yi+3) or a particular position (X2,Y4) representing the coordinates (Xi+1,Yi+3) is input to the coordinate input unit 12 by the user, because a particular partitioned display block corresponding to the particular position (X1,Y3), (X2,Y3), (X1,Y4) or (X2,Y4) is placed on a particular lower portion of a particular character area, the pair of seventh type fonts F17A and F17B, the pair of eighth type fonts F18A and F18B, the pair of tenth type fonts F20A and F20B or the pair of eleventh type fonts F21A and F21B, in which a pivotal portion of a pointing character is placed in the particular lower portion of a font area of the seventh type font F17A, the eighth type font F18A, the tenth type font F20A or the eleventh type font F21A, is selected by the on-screen displaying circuit 24, and a pointing character indicated by the pair of seventh type fonts F17A and F17B, the pair of eighth type fonts F18A and F18B, the pair of tenth type fonts F20A and F20B or the pair of eleventh type fonts F21A and F21B is superimposed on the video image to arrange a portion of the pointing character indicated by the seventh type font F17A, the eighth type font F18A, the tenth type font F20A or the eleventh type font F21A in a particular character area corresponding to the particular position (X1, Y3), (X2,Y3), (X1,Y4) or (X2,Y4) and to arrange the remaining portion of the pointing character indicated by the seventh type font F17B, the eighth type font F18B, the tenth type font F20B or the eleventh type font F21B in a neighboring character area adjacent to the particular character area in the lower direction.

Also, when a particular position (X3,Y3) representing the coordinates (Xi+2,Yi+2) are input to the coordinate input unit 12 by the user, because a particular partitioned display block corresponding to the particular position (X3,Y3) is placed on a lower right portion of a particular character area, the three ninth type fonts F19A, F19B and F19C, in which a pivotal portion of a pointing character is placed in the lower right portion of a font area of the ninth type font F19A, are selected by the on-screen displaying circuit 24, and a pointing character indicated by the three ninth type fonts F19A, F19B and F19C is superimposed on the video image to arrange a first portion of the pointing character indicated by the ninth type font F19A in a particular character area corresponding to the particular position (X3,Y3), to arrange a second portion of the pointing character indicated by the ninth type font F19B in a first neighboring character area adjacent to the particular character area in the right direction and to arrange the remaining portion of the pointing character indicated by the ninth type font F19C in a second neighboring character area adjacent to the first neighboring character area in the lower direction.

Also, when a particular position (X3,Y4) representing the coordinates (Xi+2,Yi+3) are input to the coordinate input unit 12 by the user, because a particular partitioned display block corresponding to the particular position (X3,Y4) is placed on a lowest right portion of a particular character area, the four twelfth type fonts F22A, F22B, F22C and F22D, in which a pivotal portion of a pointing character is placed in the lowest right portion of a font area of the twelfth type font F22A, are selected by the on-screen displaying circuit 24, and a pointing character of the four twelfth type fonts F22A, F22B, F22C and F22D is superimposed on the video image to arrange a first portion of the pointing character indicated by the twelfth type font F22A in a particular character area corresponding to the particular position (X3,Y4), to arrange a second portion of the pointing character indicated by the twelfth type font F22B in a first neighboring character area adjacent to the particular character area in the lower direction, to arrange a third portion of the pointing character indicated by the twelfth type font F22C in a second neighboring character area adjacent to the particular character area in the right direction and to arrange the remaining portion of the pointing character indicated by the twelfth type font F22D in a third neighboring character area adjacent to the second neighboring character area in the lower direction.

Accordingly, even though the number of partitioned display blocks in one character area is increased, because a pointing character indicated by a plurality of fonts is shown on an image screen to extend over a plurality of partitioned display blocks, the shape of the pointing character can be arbitrarily designed while maintaining visibility of the pointing character for viewers at a high level.

Also, even though the whole figure of the pointing character cannot be shown in only a particular character area corresponding to a particular position (X,Y) input by a user, because a pivotal portion of the pointing character is shown in the particular character area and because the remaining portion of the pointing character is shown in one or more neighboring character areas adjacent to the particular character area, the viewers can look at the pointing character shown in the image screen without any uncomfortable feeling. Therefore, even though the number of partitioned display blocks in one character area is increased because of a very low display performance of the image screen (or the large image screen) corresponding to one character area, as compared with a position receiving performance of the touch screen panel corresponding to one partitioned input block indicated by coordinates (X,Y), the whole figure of the pointing character can be shown on the image screen or the large image screen at a high visibility.

Also, when the user moves his finger while keeping the contact of the finger with the touch screen panel, because the user feels as if the pointing character displayed on the image screen is smoothly moved every partitioned display block with the movement of the finger, a viewer does not receive an uncomfortable feeling from the movement of the pointing character.

Also, because a plurality of fonts can be easily stored in the pointing character storing unit 22, a general television receiver or a general monitoring unit can be used as the on-screen displaying circuit 24, so that the image displaying apparatus 21 can be manufactured at a low cost.

Also, a display performance for the pointing character can be improved in proportion to the number of dots composing the pointing character. For example, in cases where the pointing character is composed of 12 dots in the lateral direction and 18 dots in the longitudinal direction (12*18 dots), a display performance for the pointing character can be improved by 12 times in the lateral direction and 18 times in the longitudinal direction.

In the first and second embodiments, the touch screen panel is used as the coordinate input unit 12. However, it is applicable that a mouse, a write pen or a joy stick be used as the coordinate input unit 12.

Also, the image displaying apparatuses according to the first and second embodiments are used for a presentation apparatus. However, the present invention is not limited to the presentation apparatus.

Also, the pointing character in the first or second embodiment is a pointer marker having a shape of an arrow. However, the pointing character is not limited to this pointing marker, and it is applicable that an arbitrary character or mark be used as the pointing character.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. An image displaying apparatus for displaying a pointing character on a display, comprising:

position input means divided into a plurality of display blocks for generating position input information, said position input information indicating one of said plurality of display blocks of said position input means;

a display circuit for generating a display signal for a predetermined basic area of the display, said predetermined basic area of the display corresponding to a plurality of display blocks of said position input means;

storing means for storing font data representing a plurality of fonts to be displayed on said display, each of said plurality of fonts corresponding to a portion of said pointing character, said display circuit using said font data for generating a particular display signal representing a particular pointing character at a particular location within a particular basic area of said display in accordance with said position input information; and control means for controlling said display circuit to selectively include, in said particular display signal, font data representing a particular combination of said plurality of fonts in said storing means, said control means determining said combination in accordance with a particular one of said display blocks indicated by said position input information from said position input means, thereby to display said particular pointing character in superposition on a displayed image and located at said particular location within said particular basic area determined by said one of said display blocks of said position input means.

2. An image displaying apparatus according to claim 1, wherein said position input means comprises a touch screen panel.

3. An image displaying apparatus according to claim 1, wherein said particular pointing character comprises an arrow having a pivotal portion thereof positioned within said particular basic area in accordance with said position input information from said position input means.

4. An image displaying apparatus according to claim 1, wherein said predetermined basic area of the display corresponds in size to an area for displaying a single character.

5. An image displaying apparatus for displaying a pointing character on a display, comprising:

position input means divided into a plurality of display blocks for generating position input information, said position input information indicating one of said plurality of display blocks of said position input means;

a display circuit for generating a display signal for a predetermined basic area of the display, said predetermined basic area of the display corresponding to a plurality of display blocks of said position input means;

storing means for storing font data representing a plurality of fonts to be displayed on said display, each of said plurality of fonts corresponding to a portion of said pointing character, one of said plurality of fonts including a pivotal feature of said pointing character;

said display circuit using said font data to generate a particular display signal representing a particular pointing character, wherein said display circuit generates said particular display signal to display said pivotal feature of said particular pointing character at a particular location within a particular basic area of said display in accordance with said position input information, and control means for controlling said display circuit to selectively include, in said particular display signal, font data representing a particular combination of said plurality of fonts in said storing means, said control means determining said combination in accordance with a particular one of said display blocks indicated by said position input information from said position input means, thereby to display said particular pointing character in superposition on a displayed image with the pivotal feature of said particular pointing character being located at the particular location within the particular basic area corresponding to said one of said display blocks of said position input means.

* * * * *

UNITED STATES PATENT AND TRADEMARK OFFICE
CERTIFICATE OF CORRECTION

| | |
|---|---|
| PATENT NO. : 6,215,479 B1 | Page 1 of 1 |
| DATED : April 10, 2001 | |
| INVENTOR(S) : Matsui | |

It is certified that error appears in the above-identified patent and that said Letters Patent is hereby corrected as shown below:

<u>Title page,</u>
Item [56], FOREIGN PATENT DOCUMENTS, the last document is
8-139675     5/1996 (JP)

Signed and Sealed this

Sixth Day of November, 2001

Attest:

*Nicholas P. Godici*

NICHOLAS P. GODICI
*Attesting Officer*   *Acting Director of the United States Patent and Trademark Office*